(12) United States Patent
Glaesener et al.

(10) Patent No.: US 7,510,393 B2
(45) Date of Patent: Mar. 31, 2009

(54) MOLD CARRIER PLATE

(75) Inventors: Pierre Glaesener, Bissen (LU); Arnold Mai, Irrel (DE)

(73) Assignee: Husky Injection Molding Systems Ltd., Bolton, ON (CA)

( * ) Notice: Subject to any disclaimer, the term of this patent is extended or adjusted under 35 U.S.C. 154(b) by 182 days.

(21) Appl. No.: 11/673,268

(22) Filed: Feb. 9, 2007

(65) Prior Publication Data

US 2008/0193585 A1 Aug. 14, 2008

(51) Int. Cl.
*B29C 45/20* (2006.01)
(52) U.S. Cl. ........................................ 425/572
(58) Field of Classification Search ................. 425/572
See application file for complete search history.

(56) References Cited

U.S. PATENT DOCUMENTS

| | | | |
|---|---|---|---|
| 4,219,323 A * | 8/1980 | Bright et al. ................ | 425/572 |
| 5,921,327 A | 7/1999 | Henriksson et al. | |
| 2005/0238758 A1 | 10/2005 | Ciccone et al. | |

FOREIGN PATENT DOCUMENTS

CA 2579263 A1 4/2006

WO 2006039782 4/2006

\* cited by examiner

*Primary Examiner*—Tim Heitbrink

(57) ABSTRACT

To facilitate cleaning of melt channels in a runner system (102) in a centre-section carrier (20) or the like, a multi-piece interface adaptor (114, 116, 118) is detailed in FIG. 4. A male portion (114) of the interface adaptor (112) is securely coupled to the runner system (102) to extend the melt channel (63) thereof. The male portion (114) preferably includes a branching feature (124) that splits melt flow into opposing directions to feed distinct nozzles (60, 62). A female portion (116) of the interface adaptor includes bores (144, 146) that align with the branching feature (124, 134, 136) and support the mounting of nozzles (60, 62) therein. The female portion (116) is fixedly secured within the carrier (20). The male portion (114) and the female portion (116) are slidably engageable with one another along sealing surfaces (130, 220). At system operating temperatures, effective operational sealing occurs as a result of relative thermal expansion between the male portion (114) and the female portion (116). At lower temperatures, pulling of the runner system (102) along an axis aligned with its melt channel (63) permits the male portion (114) to be separated from the female portion (116) by disengaging the sealing surfaces (130, 220), thereby granting easy access to the melt channels and the branching feature (124) when the runner system (102) is removed from the carrier (20).

7 Claims, 6 Drawing Sheets

MOLD CARRIER PLATE

BACKGROUND TO THE INVENTION

This invention relates, in general, to an interface adaptor for use between a hot runner manifold and a machine nozzle of an injection molding machine and is particularly, but not exclusively, applicable to injection molding system configurations which employ a centre section carrier (or a stack mold arrangement) to permit the use of multiple molds for increased productivity, simultaneous overmolding operations or the like. The present invention also pertains to a method of disassembly of a hot runner adaptor to permit cleaning of the hot runner.

SUMMARY OF THE PRIOR ART

In the production of plastic or metal parts, melt from an extruder is usually communicated to a mold cavity or mold cavities through some form of distributor, such as a hot runner or a cold runner. The distributor (usually and interchangeably referred to as a "manifold") typically includes a central melt channel that is split one or more times to provide individual melt conduits or "drops" to various mold gates or cavities of a mold. Alternatively, a central melt channel of a specific manifold may be split to provide fluid communication to distinct sprues or nozzles of different molds. In the latter respect, there are two particular system configurations in which a manifold and an accompanying extended sprue bar are used to supply melt to different molds, namely: i) with the use of a centre section carrier in a Tandem® injection molding machine; and ii) in a stack mold where the extended sprue bar lies substantially along the centre line of the machine and extends from a central mold carrier.

In WO 2006/039782 a centre section carrier of a Tandem® injection molding machine is shown (see FIG. 4 of that document). A side-offset plasticizing unit is connected through a hot runner extension to a hot runner manifold, with this side-offset unit complementing an axially in-line injection unit. Together the first and second injection units permit the production of multi-material parts. The hot runner manifold, located in the centre section carrier, includes a relatively long melt channel that feeds opposing mold halves through opposing sprue bushings on opposite sides of the carrier. Access to the melt channel is attainable only with removal of the hot runner from the carrier and comprehensive disassembly of the hot runner.

A typical stack mold is described in U.S. Pat. No. 5,921, 327. In this document, a sprue bar assembly for a melt transfer channel includes a sprue bar and a sprue bar sleeve. When the stack mold is opened, the sprue bar slides inside the sprue bar sleeve, thereby capturing leakage from the sprue bar. In this case, the length of the sprue bar is sufficient to reach the distributor is the farthest most mold carrier plate. Again, access to the sprue bar and the manifold is only achievable with disassembly of the system, i.e. retraction of carriage on which the injection unit is fixed and dismantling of the mold/runner sub-assembly.

In certain molding applications, melt channel contamination is a significant issue. Such melt channel contamination can occur with staining or when degraded resin gets hung up within the melt channel. This degraded resin can eventually find its way into, or otherwise influence the production of, the molded part. Consequently, in applications where a high degree of transparency is required in the finished part, e.g. car headlight lenses, it is therefore necessary for the melt channel to be periodically cleaned to remove contaminants or proactively to prevent the likelihood of contamination occurring. Unfortunately, this cleaning operation is both timely and costly because of the labour/time involved to dismantle the hot runner and carrier plates and because of the resulting disruption to production, respectively.

Conversely, with direct feed from an injection nozzle into a mold fixed to a stationary platen, the overall length of the melt channel is relatively short. In practical terms, the shorter the melt channel, the less likelihood of resin degradation and staining and, consequently, the less overall maintenance. However, with direct feed systems that are restricted to a single mold (albeit potentially having multiple cavities), productivity may be relatively low when compared with parallel or sequential operation achieved in stack molds or Tandem® injection molding machines that split the melt channel in centre-section carrier or the like.

In summary, with any channel splitting of the resin path in either the manifold or a related manifold channel extension, the overall length of the channel and/or the overall channel geometry presents a problem for the effective and efficient production of, particularly, molded transparent parts. Any extension part generally makes the resultantly lengthened internal channel less accessible for cleaning purposes, while the encapsulated nature of the manifold within the carrier plate (or the like) means that extensive dismantling of the manifold is necessary to effect cleaning.

SUMMARY OF THE INVENTION

According to a first aspect of the present invention there is provided an interface adaptor for a runner system through which, in use, melt flows at an operational temperature thereof, the interface adaptor comprising: a male part having: a first melt channel; a first sealing surface; and a first coefficient of thermal expansion; and a female part having: a second melt channel; a second sealing surface; and a second coefficient of thermal expansion that is different to the first coefficient of thermal expansion; wherein the male part and the female part are arranged: i) to be slideably engageable with one another along the first and second sealing surfaces to permit internal alignment of the first melt channel with the second melt channel; ii) to experience, as the operational temperature is approached, a relative expansion that produces an effective operational seal between the first and second sealing surfaces at substantially the operational temperature; and iii) to be separable from one another at a lower temperature substantially below the operational temperature, the separation accomplishable as a result of sufficient relaxation of the seal between the first and second sealing surfaces, whereafter separation of the male portion provides further access to at least the first melt channel.

In a second aspect of the present invention there is provided a male part of a multi-piece runner extension interface, the male part having a body comprising: a generally cylindrical exterior surface; an internal axial channel terminating at least one outlet in the exterior surface; and sealing surfaces on the exterior surface, the sealing surfaces surrounding the at least one outlet and arranged to produce a seal substantially at an operating injection temperature; wherein the male part is, in use, complementarily engaged with a female part along the sealing surfaces and the male part has a thermal expansion coefficient different to that of the female part, the sealing surfaces of the male part further dimensioned to permit relaxation of the seal at a release temperature substantially below the operating injection temperature, thereby allowing separation of the male part from the female part at that lower release temperature.

In another aspect of the present invention there is provided a mold carrier plate having opposing first and second sides, the mold carrier plate including: a hot runner assembly located between the first and second sides, the hot runner including a central melt channel substantially parallel to the first and second sides; a female part of a hot runner adaptor interface fixedly positioned between the first and second sides, the female part including a substantially transversely extending melt channel; a male part of the hot runner adaptor interface having an axial channel therein, the male part fixedly coupled to the hot runner assembly such that the axial channel is in fluid communication with the melt channel, wherein the male part is slideably engageable with the female part along sealing surfaces whereupon the axial channel internally aligns with the transversely extending melt channel of the female part.

In yet a further aspect of the present invention there is provided a method of disassembling a runner system having: a multi-piece adaptor interface containing a male part having an axial channel therein and a female part slideably engageable by the male part, the male part sealable against the female part along sealing surfaces at an injection temperature of the multi-piece adaptor interface, the female part including a melt channel alignable with the axial channel; a manifold coupled to the multi-piece adaptor interface, the manifold including: a central melt channel coupled to and in fluid communication with the axial channel of the male part, a plurality of heaters providing heat to the runner system; the method comprising: restricting an amount of heat supplied by the heaters to that necessary to generate disengagement temperature in the runner system that is below the injection temperature of the runner system but above a temperature at which solidification of plastic melt occurs in the axial channel and the central melt channel, the disengagement temperature relaxing seal forces along the sealing surfaces; disengaging the male part from the female part by pulling the manifold away from the female part, thereby providing access to the axial channel in the male part and the melt channel in the female part.

Advantageously, the present invention now provides a mechanism that facilitates hot runner removal to clean an extended hot runner melt channel. Minimal disassembly of the hot runner per se is required, with the present invention permitting a substantial portion of the hot runner channel (especially in the context of a carrier or Tandem® molding system environment) to be accessed and cleaned. While the female adaptor portion is locked in place within the carrier, the complementary male adaptor portion can be disengaged and separated relatively easily from the female adaptor portion, thereby permitting quick exchange of a (new or cleaned) hot runner interface adaptor to reduce downtime. Indeed, while general cleaning is facilitated, quick swap-out is also a practical solution, whereby cleaning of the removed adaptor sub-assembly (and manifold) can be undertaken in parallel with an ongoing production run using a newly installed male adaptor/runner assembly. Consequently, the present invention enhances overall system productivity and reduces the likelihood of contamination by permitting regular, proactive maintenance with minimum system downtime.

Furthermore, with the use of sealing surfaces lying in the plane of the melt channel of the hot runner, the present invention benefits from reduced/substantially eliminated axial forces from pressurized melt.

BRIEF DESCRIPTION OF THE DRAWINGS

Exemplary embodiments of the present invention will now be described with reference to the accompanying drawings in which.

DETAILED DESCRIPTION OF A PREFERRED EMBODIMENT

Figure 1:
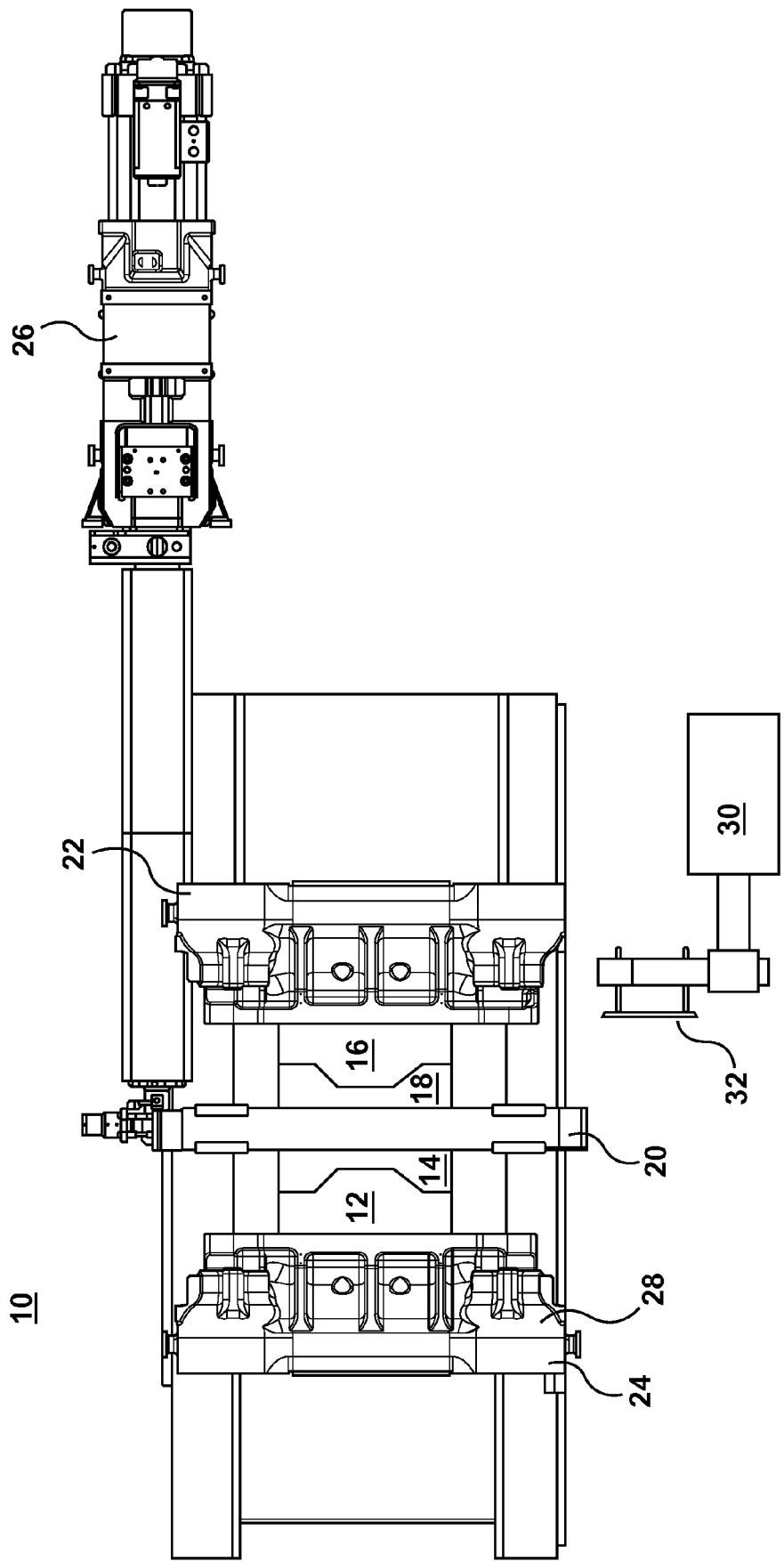
FIG. 1 is a schematic representation of a typical injection molding machine into which the present invention can be incorporated.

FIG. 1 shows a typical injection molding machine 10 that can be adaptable to support the runner interface adaptor of the various embodiments of the present invention. Like conventional machines, during each injection cycle the molding machine 10 produces a number of plastic parts corresponding to a mold cavity or cavities defined by complementary mold halves 12, 14 and 16, 18 located within the machine 10. FIG. 1 includes a fixed centre-section carrier 20 that supports a suitable runner system, with each side of the centre-section carrier 20 having a mold half mounted thereon.

The injection molding machine 10 also includes, without specific limitation, a first moving platen 22 and a second moving platen 24 which both support mold halves 12, 16 which cooperate with the complementary mold halves 14, 18 mounted on the centre-section carrier 20. A side-mounted injection unit 26 plasticizes and injects material through the runner system of the centre-section carrier.

In operation, the first and second moving platens 22, 24 are moved relative to the fixed centre-section carrier 20 by means of stroke cylinders (not shown) or the like. Clamp force is developed in the machine, as will readily be appreciated, through the use of tie-bars and a tie-bar clamping mechanism 28. The clamping mechanism 28 is (generally) fixedly attached to the first moving platen 22 (typically through the use of bolts), with each clamping mechanism usually extending at least partially into a corresponding bore that extends through the platen at the corners thereof. It is usual that a floating end of the tie-bar is free to move relative to the second moving platen. Once a tie-bar is positively engaged in its respective clamp mechanism 28, mold clamp force (i.e. closure tonnage) can be applied through the use of (typically) a hydraulic system that is usually directly associated with the clamp mechanism.

Of course, in certain systems, the reverse anchoring methodology may be applied. Equally, a different clamp mechanism, e.g. a toggle clamp, may be used to develop clamp tonnage, since this is subject to design freedom.

The mold halves 12-18 together constitute molds generally having one or more mold cavities or one or more injection gates into a particular mold cavity. The mold halves will, as usual, include projections (such as leader pin alignment columns) that must be aligned and interconnected accurately to avoid wear and to produce commercially acceptable parts. Since such standard components merely benefit from the invention but do not relate to the implementation of the solution offered by the various embodiments of the present invention, specific detailing has been omitted for reasons of brevity and clarity (within the drawings).

A robot 30 is provided adjacent the first moving platens 22, 24 to carry an end-of-arm-tools (EOAT) 32 that de-mold injection molded parts. The EOAT is typically a suction based tool. For large tonnage application, the robot 30 is typically mounted directly onto and above the centre-section carrier 20 and will operate to remove one or a couple of molded products each cycle using well-known gripper and/or suction technology. In a Tandem® machine environment, a single robot may remove multiple parts from the two molds (in which case one might implement a dual inclined robot). Otherwise, it might be preferably to use two distinct 6-axis robots. In the particular realisation of a take-out plate for preforms, the take-out plate contains a number of cooling tubes at least corresponding in number to the number of preforms produced in each injection cycle.

In use, in a mold open position, the robot(s) 30 moves the EOAT 32 into alignment with, typically, the core sides of the molds and receive the molded articles, e.g. a car bumper or multiple parts. A stripper plate or its functional equivalent (e.g. actuators or lift rods) may be used to facilitate release of the molded article/part from the core.

Figure 2:
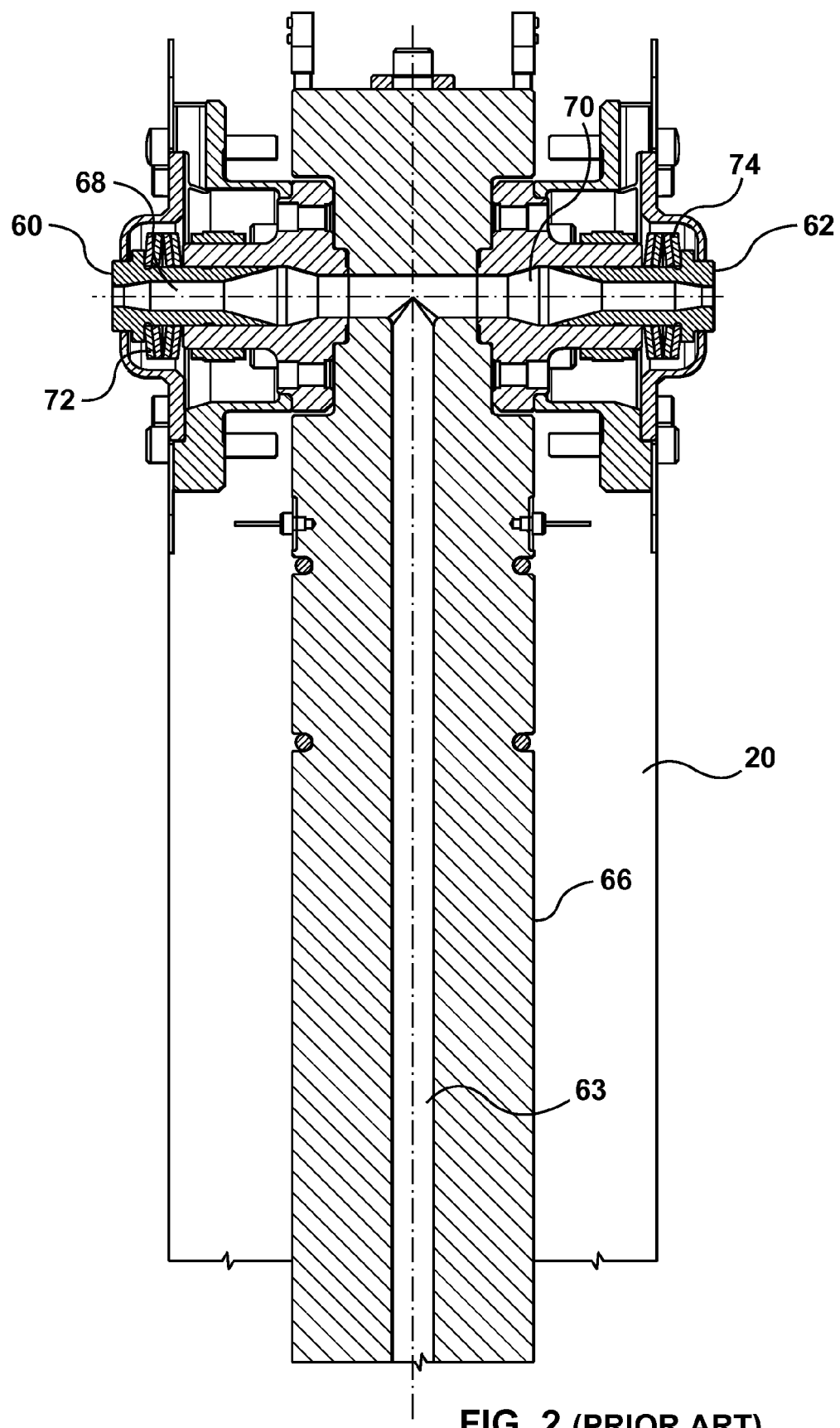
FIG. 2 is a schematic diagram of a prior art hot runner shown in situ within a centre section carrier.

Referring to FIG. 2, a the prior art hot runner assembly that is shown in situ within a conventional centre section carrier 20. Back-to-back first and second nozzles 60, 62 are fed melt (such as substantially homogenized molten resin) through a central melt channel 63 of a hot runner 66. Proximate to the nozzles 60, 62, the central melt channel 63 undergoes a two-way split (at a T-junction) to provide individual melt channels 68, 70. In a conventional sense, each nozzle is typically positively biased (relative to the hot runner) with an appropriately positioned disk spring 72, 74, as will be readily appreciated by the skilled addressee.

Figure 3:
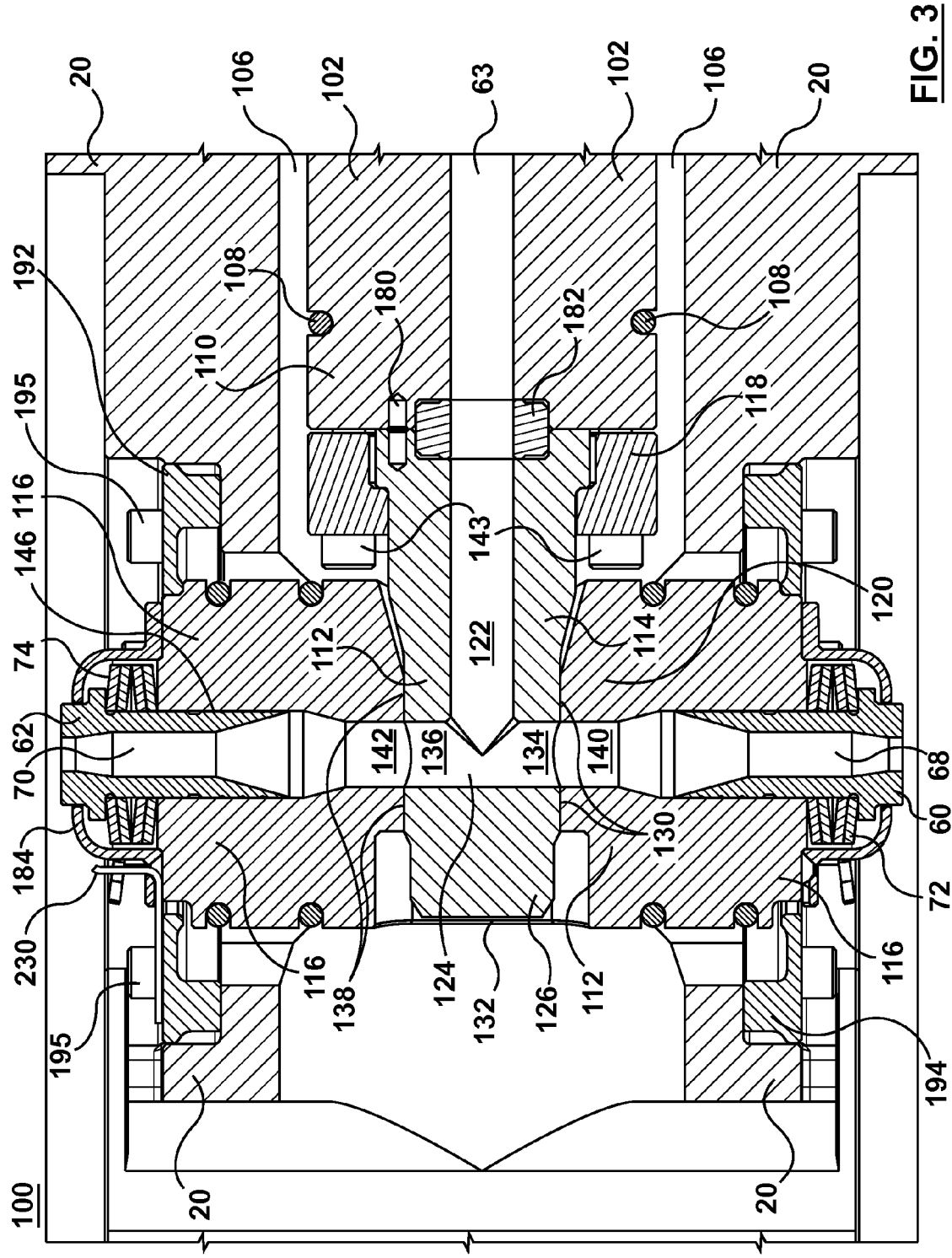
FIG. 3 is a section view through a hot runner assembly according to a preferred embodiment of the present invention.

FIG. 3 shows a section view through a hot runner assembly 100 according to a preferred embodiment of the present invention. More particularly, a hot runner manifold 102 is located, in a conventional fashion, within a centre section carrier 20. For thermal insulation reasons, a air gap 106 is generally provided around the hot runner manifold 102, while insulator blocks (not shown) retain the hot runner manifold 102 within the carrier 20. Along the length of the hot runner manifold 102, at periodic distances, controllable heaters 108 ensure that, in use, melt remains in a sufficiently molten state to ensure flow through the central melt channel 63 to permit, eventually, injection thereof into the mold.

At a first end 110 of the hot runner manifold (in the sense that the first end is at the end of the central melt channel 63 and distant from an injection unit), a multi-piece hot runner interface adaptor 112 couples the central melt channel 63 of the hot runner manifold to one or more secondary melt channels 68, 70 within nozzles 60, 62. More specifically, the hot runner interface adaptor 112 contains, in one particular embodiment, a three-piece assembly realized by a male adaptor portion 114, a female adaptor portion 116 and a flanged retainer 118. The overall hot runner interface adaptor simply therefore provides a melt channel connection between the hot runner manifold per se and the machine nozzles.

The male adaptor portion 114 is preferably realized by a generally cylindrical body 120 having a longitudinal channel 122 extending therethrough. In use, the longitudinal channel 122 is substantially aligned with (and thus in fluid communication with) the central melt channel 63 of the hot runner manifold 102. The longitudinal channel 122 is then interrupted by a branching intersection 124 that splits the flow path into (usually) two distinct paths that respectively feed the nozzles 60, 62. In the illustration of FIG. 3, the branching intersection 124 intersects the longitudinal channel 122 substantially at a right angle, although any intersecting angle could be used. From a practical perspective, the branching intersection 124 is defined along its top side by an internal surface of a nose portion 126 of the male adaptor portion 114. Of course, the male adaptor may simple include a single outlet in which case the branching intersection 124 is appropriately structurally modified to reduce it complexity.

The nose portion 126 extends into a suitably configured recess 128 in the female adaptor portion 116. A shoulder 127 (seen particularly well in FIG. 4) between the nose portion 126 and the cylindrical body preferably defines the longitudinal alignment of (first) melt channels 134, 136 in the male adaptor portion with (second) melt channels 140, 142 in the female adaptor portion 116. The male adaptor portion 114 and the female adaptor portion 116 are arranged to seal together along an external sealing surface 130 and an abutting internal sealing surface 138 in the female adaptor portion 116; the sealing surfaces 220 are specifically identified in FIG. 6.

The nose portion 126 preferably also includes a suitable anti-rotation feature 132 (such as a pin or, alternatively, a flat projection seen in FIG. 4) that positively engages into a corresponding-shaped key 135 in the female adaptor portion 116. The anti-rotation feature 132 ensures that melt channels 134, 136 in the branching intersection 124 accurately align with corresponding melt channels 140, 142 in the female adaptor portion 116.

The male adaptor portion 114 is mechanically coupled to the hot runner 102 in a manner sufficient to prevent melt leakage under injection pressures. Typically, the mechanical coupling is achieved through the use of a plurality of bolts 143. Specifically, the flanged retainer 118 is arranged to positively engage the male adaptor portion 114 towards a base end of the male adaptor portion that, in use, seals against the end 110 of the hot runner 102. For example, the flanged retainer 118 is arranged to engage positively into a latch (or the like) that is cut into an external surface of cylindrical body 120 of the male adaptor portion 114. The flanged retainer 118 can then be secured to the end of the hot runner 102 (e.g. through the use of bolts 143) to align the central melt channel 63 with the longitudinal channel 122 in the male adaptor. The flanged retainer 118 may, in an alternative embodiment (shown in FIG. 6), be integrally formed with the male adaptor portion 114 to provide a generally frusto-conical shape for the body of the male adaptor portion 114, but in the embodiment shown in FIG. 3 the flanged retainer 118 is provided as a separate component.

To facilitate alignment and orientation of the hot runner 102 with the male adaptor portion 114, an alignment dowel 180 may be located therebetween. Furthermore, to ensure an effective seal, a compression seal 182 (or other suitable form of ring seal) is preferably located about the (e.g. recessed into both) interface of the central melt channel 63 of the hot runner 102 and the longitudinal channel 122 in the male adaptor portion 114.

According to the present invention, sealing between the external sealing surface 130 of the male adaptor portion 114 and an abutting internal sealing surface 138 in the female adaptor portion 116 is perfected under specific operating temperatures and due to the effects of relative thermal expansion. Consequently, materials of the male adaptor portion 114 and the female adaptor portion 116 are selected to permit a relative component expansion such that a tighter fit is developed between the male adaptor portion 114 and the female adaptor portion 116 at operational temperatures only. At a temperature below injection temperature where the melt remains fluid (e.g. about 150 to 200 degrees Celsius), there is sufficiently decreased thermal expansion and sealing between the male adaptor portion 114 and the female adaptor portion 116 to permit separation of these two components. At relatively cold temperatures, solidified plastic is likely to prevent the seal between the male adaptor portion 114 and the female adaptor portion 116 from being broken without excessive force, so the present invention promotes the disassembly of the system at suitably elevated temperatures.

The female adaptor portion 116, as will be appreciated, is preferably realized by a cylindrical body that has longitudinally-orientated, interconnecting and profiled bores 144, 146 to permit the location/mounting of nozzles (or the like). The function of the female adaptor portion 116 is therefore to place the melt channels 140, 142 (in the female adaptor portion 116) in fluid communication with the melt channels in the nozzles 60, 62.

In a conventional sense, each bore 144, 146 may include profiled internal walls having varying diameters and inclined surfaces that facilitate mounting and effective sealing of the nozzles 60, 62. Specifically, as will be understood, by increasing and then decreasing the diameter of the melt channel in the vicinity of each nozzle, pressure differentials in the melt act to force the nozzle forward (into the direction of a sprue to the mold), with this forward motion supported by disk springs 72, 74 that act on the nozzle 60, 62. A main axis of the female adaptor portion 116 (and particularly the bores 144, 146) is therefore between parallel edge surfaces of the carrier and thus substantially perpendicular to the central melt channel 63 in the hot runner 102.

Figure 4:
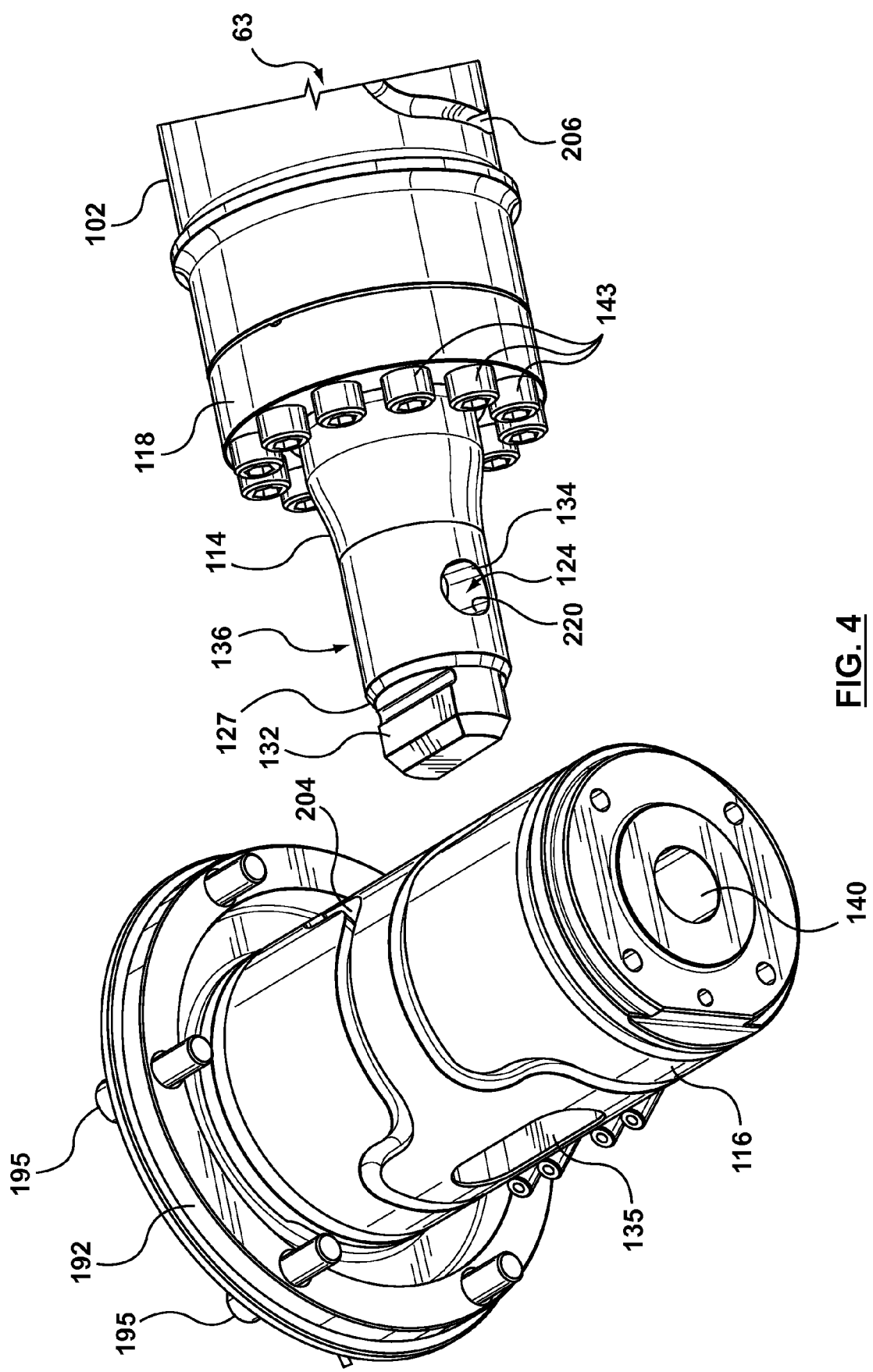
FIG. 4 is a perspective view of a preferred aspects of a hot runner interface adaptor of the present invention.

FIG. 4 provides an exploded perspective view of how the male adaptor portion 114 is slidably connectable to the female adaptor portion 116. FIG. 4 furthermore shows how the various melt channels and bores in the male and female parts align with each other to provide a continuous fluid path from the runner to each nozzle.

Figure 5:
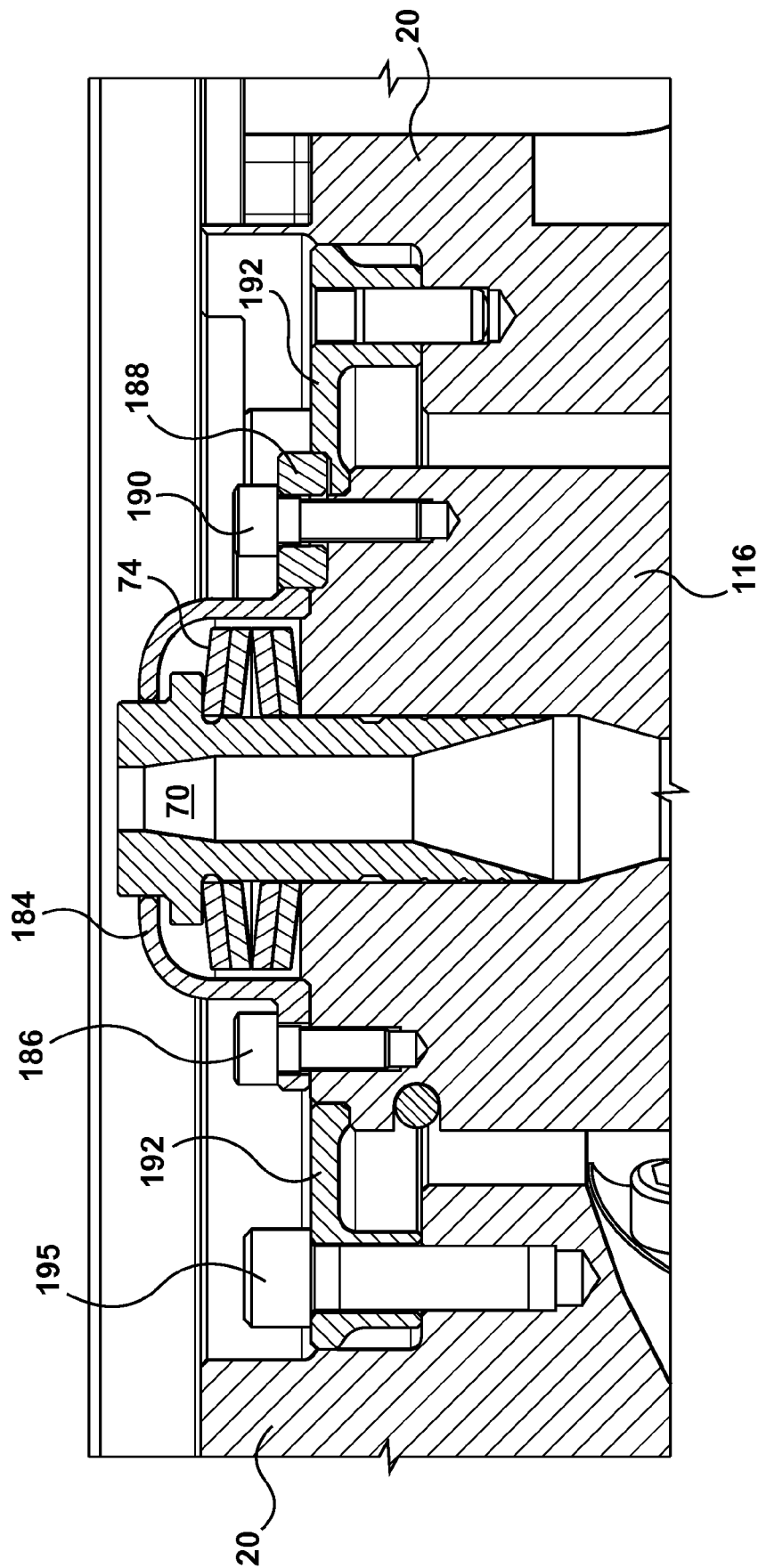
FIG. 5 provides additional detail relating to a preferred way in which a nozzle is attached to a female portion of the hot runner interface adaptor of FIG. 3.

Turning to FIG. 5, it can be seen that the nozzle cup 184 is suitably secured to the female adaptor portion 116, e.g. through the use of a bolt 186 or the like. Positioning and rotational orientation of the female adaptor portion 116 is preferable achieved through the use of an edge-located retaining member 188 (or the like) that abuts against or surrounds the insulator ring 192. The edge-located retaining member 188 is secured, for example, to the female adaptor portion 116 with a bolt 190 (or the like).

To align the female adaptor portion 116 into the carrier 20 of the hot runner, it is preferred that an insulator ring 192, 194 provides a centering mechanism and fixing mechanism. The insulator ring 192, 194 is therefore appropriately bolted (by bolts 195) to the carrier 20, with the insulator ring 192, 194 typically resting on a ledge 196 formed within a recessed region machined/cut into each opposing face of the carrier 20.

Zone-controlled heating of melt may be achieved through the use of any suitable heating element, including heater coils 108, 2002. The location of the heaters will be readily appreciated by the skilled addressee, albeit that representative positioning is shown in FIG. 3 and by the heater channels 204, 206 in FIG. 4. Heater coils and nozzle heaters are preferable over the use of band heaters (considered to be slightly less reliable). Heaters are typically located along the surfaces of both the female adaptor portion 116 and the runner 102.

The female adaptor portion 116 is therefore insulated (with air spaces or via the insulator ring 192) from the carrier 20. Furthermore, female adaptor portion 116 is also thermally and physically insulated from the hot runner 102 by either air gaps and/or the male adaptor portion 114.

Therefore, according to the present invention, while the female adaptor portion 116 is securely fixed between surfaces of the carrier 20, the male adaptor portion 114 is both locatable into but removable from the female adaptor portion 116. In this way, when the active seal developed by thermal expansion is relaxed sufficiently, the combined hot runner and male adaptor portion 114 (seen in FIG. 4) can be removed in a direction parallel to the axis of the central melt channel 63, thereby allowing channeling in both the female adaptor portion 116, the hot runner 102 and the male adaptor portion 114 to be cleaned without complete disassembly of the runner 102. Contrasting the limited disassembly requirements (for cleaning purposes) supported by the present invention, it is noted that the prior art configuration would require additional and time extensive removal of the molds from the centre-section carrier 20.

Figure 6:
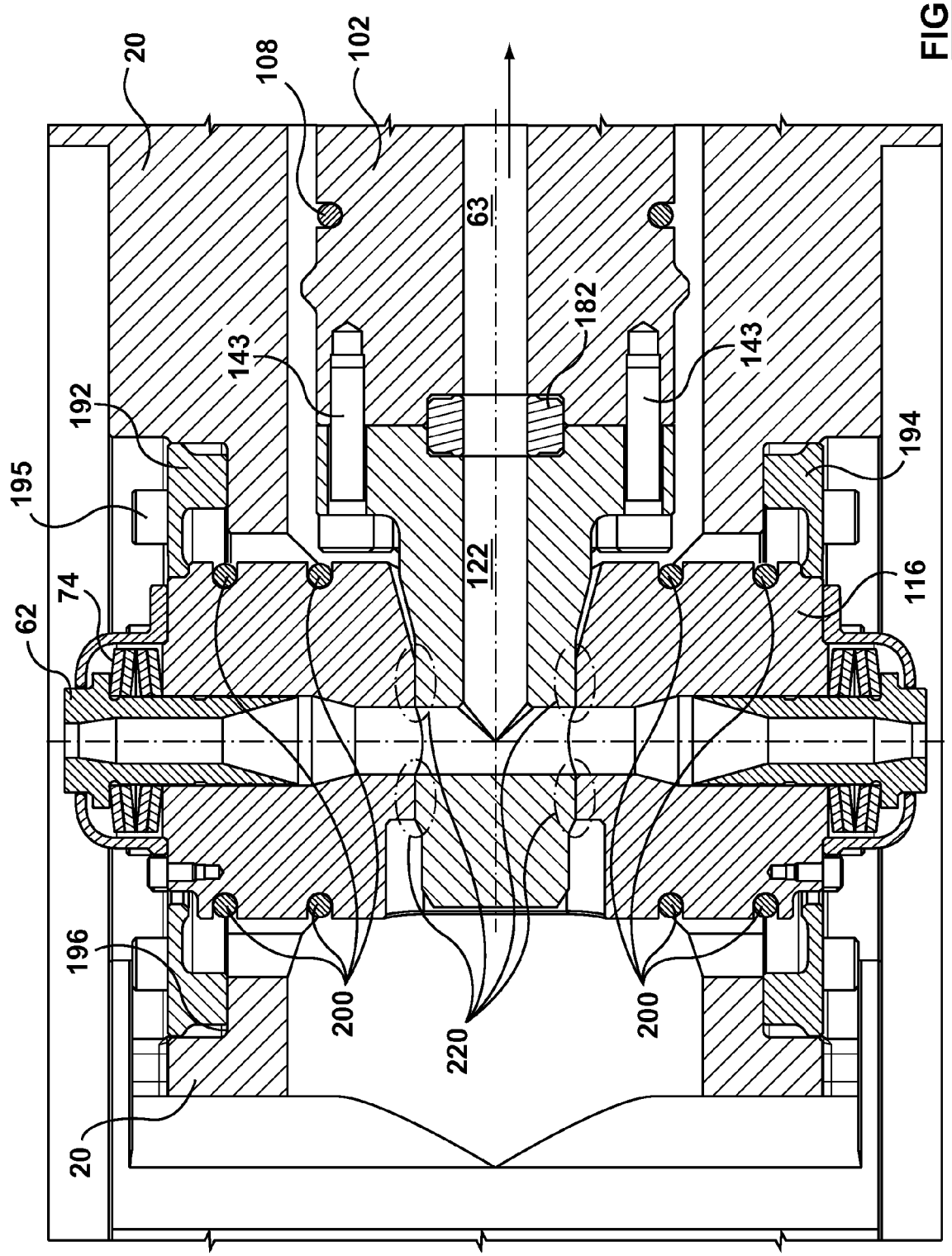
FIG. 6 is an in situ view of an alternatively configured multi-piece hot runner interface adaptor of the present invention.

Referring briefly to FIG. 6, the male adaptor portion 114 and the flanged retainer 118 are shown integrally formed as a single piece. For elucidation, critical sealing surfaces 220 between the male adaptor portion 114 and the female adaptor portion are circled. As previously indicated, as the overall system approaches injection temperatures, the sealing surfaces 220 become entirely stable as a result of expansion achieved through relative thermal expansion. At lower (semi-liquid) temperatures, but not when plastic within the channels has set, the degree of thermally-induced expansion coupling is eased sufficiently to permit the combined hot runner and male adaptor sub-assembly to be withdrawn from the female adaptor portion 116. Dimensions and tolerances associated with the production of the sealing surfaces are therefore of critical importance and are tightly controlled based on operating characteristics of the system, including the injection temperatures associated with the melt (either plastic or metal) that is to be injected in the mold cavity. However, the skilled addressee will readily appreciate these dimensions and tolerances based on selected materials, operating temperatures and dimensions of the specific system.

The male and female adaptor portions may be made from any suitable material, including hardened steel, beryllium copper or other equivalent materials.

Indeed, with making channeling in the combined runner and male adaptor portion relatively long compared to channeling in the female adaptor portion and nozzle, up to perhaps ~90% of potential contaminants can be retained within the male adaptor portion. For completeness, it is noted that the various embodiments of the present invention may also include an integrated drool detection system. As will be understood, such a drool detection system essentially amounts to an open pipe 230 (see FIG. 1) positioned proximate to each nozzle 60, 62. Should the pipe become blocked with plastic "drool", the pressure change in the pipe is detected by a system controller (not shown) and an alarm generated.

In summary, the present invention allows for the quick exchange of the hot runner (and also the cleaning of relatively long hot runner channels or the hot runner adaptor) without having to remove the entire mold from the molding machine/platen. Quick disassembly is achieved by pulling (to an accessible point, e.g. the non-operator side of the press) the hot runner from the carrier. The centerpiece of the carrier, i.e. the portion of the distribution system containing the two spring loaded nozzles, stays exactly in place. Quick hot runner change is therefore available when a second hot runner is already prepared; this optimizes profits for the molder and is beneficial in molding applications where unacceptable contamination can occur quickly. With the male adaptor portion 114 containing the T-junction (which is particularly susceptible to melt staining/deposition), access and cleaning of this T-junction is made much easier and faster by its ability to be disengaged from the female part of the adaptor.

It will, of course, be appreciated that the above description has been given by way of example only and that modifications and variations will be readily apparent to the skilled exponent without departing from the scope of the appended claims. For example, it is down to design choice as to whether it is the male part or the female part of the adaptor coupling that is attached to the hot runner manifold. Indeed, it is simply important that a multi-piece adaptor structure is provided to permit lateral separation along an axis of the runner 102 (whether this is a hot runner or a cold runner) and that the materials of the female and male parts (of that multi-piece adaptor) have different thermal expansion coefficients to permit effective compression sealing at operating temperatures. Specific geometries and shapes of the male and female portions of the adaptor are equally of little importance so long as functional separation of the multi-piece interface adaptor is forthcoming at an appropriate temperature. Furthermore, while the preferred embodiment makes use of bolts to connect together the various sub-components, the form of fixing is entirely arbitrary provided that the final assembly is fit-for-purpose in that the selected fixing can withstand the pressures and forces generated within an operational environment.

The present invention can, in fact, find application in any suitable runner or manifold in which there is a desire to disassemble the runner or manifold (especially on a regular basis) for cleaning purposes or access to channel splitting regions. In other words, application of the present invention to a centre-section carrier environment is not obligatory, but only representative of the application of the present invention to other environments, e.g. stack molds and, in particular, the sprue bar.

While the preferred embodiment has been shown in relation to a particular configuration of injection molding machine in which a fixed centre-section carrier 20 received melt injected from a side-mounted injection unit 26, the concepts of the present invention find application in other machine configurations, as will be readily appreciated by the skilled addressee.

Clearly, the exact locations of the various channels within the nozzle adaptor, the hot runner or the centre-section carrier do not need to be exactly central, but may be offset if the system configuration would benefit from this geometry. However, this is merely design option, as will be readily appreciated.

The multi-piece nozzle adaptor may, in fact, find application in any suitably long path in which a remote end of generally inaccessible and therefore in circumstances where it is desirable to disconnect the runner extension without total disassembly of the carrier and manifold. The sealing surfaces 220 between the male and female parts and the thermal nature of the achieved seal are therefore of particular significance to the underlying application of the present invention.

The invention claimed is:

1. A mold carrier plate having opposing first and second sides, the mold carrier plate comprising:
   a hot runner assembly located between the opposing first and second sides, the hot runner assembly including a central melt channel substantially parallel to the opposing first and second sides;
   a female part of a hot runner adaptor interface fixedly positioned between the opposing first and second sides, the female part including a substantially transversely extending melt channel;
   a male part of the hot runner adaptor interface having an axial channel therein, the male part fixedly coupled to the hot runner assembly such that the axial channel is in fluid communication with the central melt channel, wherein the male part is slideably engageable with the female part along sealing surfaces whereupon the axial channel internally aligns with the substantially transversely extending melt channel of the female part.

2. The mold carrier plate according to claim 1, wherein the axial channel includes a T-junction having two distinct paths that centrally align within the substantially transversely extending melt channel.

3. The mold carrier plate according to claim 1, wherein the male part seals against the female part along the sealing surfaces wherein an effective seal is achieved with relative expansion between the male part and the female part as an operational temperature for melt injection is approached and wherein, at a lower temperature substantially below the operational temperature, separation of the male part from the female part is achievable by pulling the hot runner assembly away from the female part following thermal relaxation of the effective seal along the sealing surfaces.

4. The mold carrier plate according to claim 1, wherein the male part includes a nose and the female part including a recess in a surface thereof, the nose locating into the recess to provide internal alignment in the hot runner adaptor interface.

5. The mold carrier plate according to claim 1, further including first and second nozzles recessed, respectively, in the opposing first and second sides, the first and second nozzles in fluid communication with the substantially transversely extending melt channel in the female part.

6. The mold carrier plate according to claim 5, wherein the female part is held in place within the mold carrier plate by insulator rings.

7. The mold carrier plate according to claim 6, wherein the mold carrier plate includes a recess in each of the opposing first and second sides, each recess arranged to accommodate an insulator ring.

* * * * *